United States Patent [19]

Chikazawa

[11] 3,870,905

[45] Mar. 11, 1975

[54] SWITCHING CIRCUIT

[75] Inventor: Hiroyuki Chikazawa, Yokohama, Japan

[73] Assignee: Sony Corporation, Tokyo, Japan

[22] Filed: Oct. 13, 1972

[21] Appl. No.: 297,409

[30] Foreign Application Priority Data

Oct. 20, 1971 Japan .................................. 46-96840

[52] U.S. Cl. .............. 307/254, 307/244, 307/247 A, 307/296

[51] Int. Cl. ............................................. H03k 17/00

[58] Field of Search ........... 307/253, 254, 246, 249, 307/250, 244, 247 A; 317/9 C; 340/265 E; 84/1.26

[56] References Cited

UNITED STATES PATENTS

| | | | |
|---|---|---|---|
| 3,037,113 | 5/1962 | Bier | 307/254 |
| 3,067,338 | 12/1962 | Baude | 307/253 |
| 3,089,964 | 5/1963 | Bruce | 307/253 |
| 3,196,201 | 7/1965 | McDonald | 84/1.26 |
| 3,207,952 | 9/1965 | Brahm | 307/247 UX |
| 3,543,053 | 11/1970 | Mustain | 307/244 |
| 3,582,799 | 6/1971 | Reid | 307/246 |
| 3,710,143 | 1/1973 | Bray et al. | 307/244 |

FOREIGN PATENTS OR APPLICATIONS

| | | | |
|---|---|---|---|
| 1,027,412 | 4/1958 | Germany | 307/254 |
| 1,098,996 | 2/1961 | Germany | 307/254 |
| 1,253,967 | 1/1960 | France | 307/253 |

*Primary Examiner*—Rudolph V. Rolinec
*Assistant Examiner*—B. P. Davis
*Attorney, Agent, or Firm*—Hill, Gross, Simpson, Van Santen, Steadman, Chiara & Simpson

[57] ABSTRACT

In a switching circuit for connecting a d.c. source to a load such as an amplifier or the like, a transistor is interconnected between the source and the load and the base of the transistor is biased by a circuit including a switch and a resistor connected from the source to the base, and a capacitor connected from the base to ground, so that the voltage at the load increases gradually after the switch is closed.

10 Claims, 3 Drawing Figures

PATENTED MAR 11 1975

3,870,905

SWITCHING CIRCUIT

BACKGROUND OF THE INVENTION

1. Field of the Invention

The present invention relates to a switching circuit and more particularly to a switching circuit employed to connect a source of d.c. voltage to a load such as an amplifier or the like, and which functions to prevent the occurrence of a click when power is applied to the load.

2. The Prior Art

The occurrence of a click when power is applied to an audio device such as a radio, a tape player or the like, is annoying to the listener, and apparatus has been devised for preventing such a click, by causing the voltage presented to the load to rise gradually, in response to the closing of the switch in series with the d.c. source. This apparatus is described in the copending Ohsawa Application, Ser. No. 291,352, U.S. Pat. No. 3,832,627, filed Sept. 22, 1972 for "Transistor Circuit with Slow Voltage Rise and Fast Voltage Fall Characteristic." While the apparatus described in the said Ohsawa application is effective to prevent the undesired clicks, that apparatus employs the customary switch, connected in series with the d.c. source, with the result that a relatively large capacity switch is required, in order to make and break the full current capacity of the load. It is desirable to provide a circuit in which a more economical switch of lower rated current may be successfully used.

SUMMARY OF THE INVENTION

Accordingly, it is a principal object of the present invention to provide a circuit for connecting the d.c. source to the load which does not produce turn-on click, and which employs a power switch having a relatively low current rating.

Another object of the present invention is to provide such a circuit, which is effective in filtering and smoothing the voltage of the d.c. source.

These and other objects of the present invention will become manifest by an examination of the following description and the accompanying drawings.

In one embodiment of the present invention there is provided a silicon transistor having its emitter and collector terminals interconnected between one terminal of a d.c. source and one terminal of a load, means for interconnecting a second terminal of the source with a second terminal of said load, a series circuit including a switch and a resistor interconnected between the d.c. source and the base of said transistor, and a capacitor interconnected between the base of said transistor and the second terminal of the source.

BRIEF DESCRIPTION OF THE DRAWINGS

Reference will now be made to the accompanying drawings in which.

DESCRIPTION OF THE PREFERRED EMBODIMENTS

Figure 1:
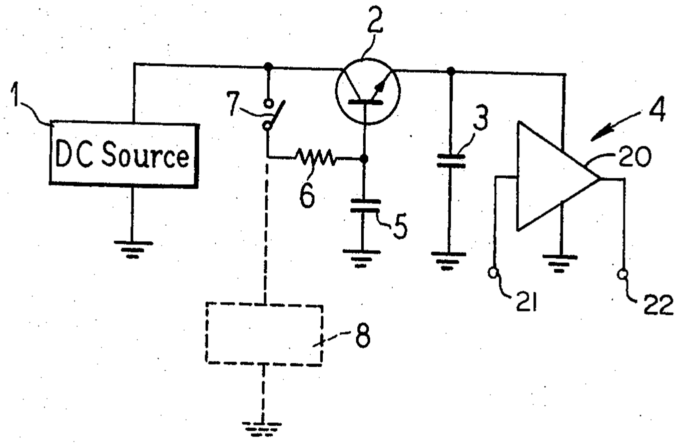
FIG. 1 is a schematic circuit diagram of an exemplary embodiment of the invention shown interconnected between a d.c. source and a load.

Referring now to FIG. 1, there is illustrated a switching circuit interconnected between a d.c. source 1 and a load 4. The source 1 may be a battery, a rectifier, or the like. The load 4 may comprise a preamplifier and a power amplifier by which an audio signal may be amplified and applied to a loudspeaker (not shown), in the conventional manner.

As shown in FIG. 1, the load 4 comprises an amplifier 20 adapted to have an audio signal connected to an input terminal 21, with an amplified audio signal being made available at a terminal 22.

A silicon npn transistor 2 has its collector connected to the positive terminal of the source 1 and its emitter connected to one terminal of the load 4. The negative terminal of the source 1 is connected to ground, as is the other terminal of the load 4. A condenser 3 is connected in parallel with the load 4, in order to bypass undesirable high frequency components, such as ripple signals or the like, to ground.

A series circuit including a switch 7 and a resistor 6 is connected between the collector and the base of the transistor 2, and a capacitor 5 is connected between the base of the transistor 2 and ground.

When the switch 7 is closed, when it is desired to apply power to the load 4, the capacitor 5 is charged through the resistor 6, and the base bias of the transistor 2 gradually rises to the voltage of the d.c. source 1, in accordance with the time constant of the circuit including the capacitor 5 and the resistor 6. As well known to those skilled in the art, this time constant is equal to RC, i.e., the product of the capacitance of the capacitor and the resistance of the resistor.

As the voltage of the base of the transistor 2 rises, the transistor 2 becomes more conductive, and the voltage at the emitter of the transistor 2 also rises. Accordingly, a gradually rising voltage is applied to the load 4, filtered by the action of the capacitor 3. There is, therefore, no sharp transient increase in voltage level applied to the load 4 such as would produce an audible click.

When the switch 7 is opened, the capacitor 5 is discharged through the base-emitter junction of the transistor 2, and through the load 4. As the capacitor 5 discharges, the transistor 2 becomes gradually less conductive, and the voltage applied to the load 4 falls gradually. The rate in which the voltage falls is determined by the RC time constant of the circuit including the capacitor 5 and the load 4. This time constant is equal to $Re \cdot C \cdot h_{FE}$, where Re is the load resistance, C is the capacitance of the capacitor 5 and $h_{FE}$ is the forward current transfer characteristic of the transistor 2.

If the load 4 includes more than one amplifier, the last stages, or the power amplifier, may be connected directly to the source 1 through the switch 7. Such a connection is illustrated by the dashed rectangle 8 which represents a power amplifier so connected. No click is produced when this connection is used, because a turn-on click is generated primarily in the initial, low-signal-level stages, and when power is applied to the power amplifier 8 via the switch 7, the amplifier stages within the load 4 are without power.

When all of the amplifier stages are incorporated into the load 4, the required current carrying capacity of the transistor 2 is greater than if the load 4 includes only low-signal-level amplifiers and the like. On the other hand, the required current capacity of the switch 7 is greater if some of the amplifier stages, such as the power amplifier 8, are connected to the source 1 directly therethrough. It is therefore possible to arrive at the most economical circuit design by choosing a relatively inexpensive, light-current switch for the switch 7, and then connecting only so many amplifier stages in the position of the power amplifier 8 as do not cause the current capacity of the switch 7 to be exceeded. In this way the switch 7 is used to its capacity, while the current carrying requirement of the transistor 2 is held to a minimum. Alternatively, an economical unit may be chosen for the transistor 2, with only so many of the initial low-signal-level stages of the amplifier connected as the load 4 as do not exceed the current carrying capacity of the transistor 2, with the remaining stages in the position of the power amplifier 8.

When the d.c. source 1 is a rectifier circuit, a d.c. generator, or the like, a ripple signal is included as a component of the output voltage. This ripple signal is connected to the base of the transistor 2 through the resistor 6, but much of it is bypassed by the capacitor 5 to ground. Therefore the transistor 2 functions as a ripple filter to reduce the amount of the ripple present in the current which flows through the load 4. This ripple filter is more effective to reduce the amount of ripple than a conventional LC or RC filter, so that the capacitance of the smoothing capacitor 3 may be a much smaller value than that of the smoothing capacitors heretofore used. As a result of using a smaller capacitor 3, the surge current through the transistor 2 when the switch 7 is first closed becomes smaller. The lower capacitance of the capacitor 3 and the lower surge current rating requirement of the transistor 2 permits the construction of a power supply more economically than would otherwise be possible.

Figure 2:
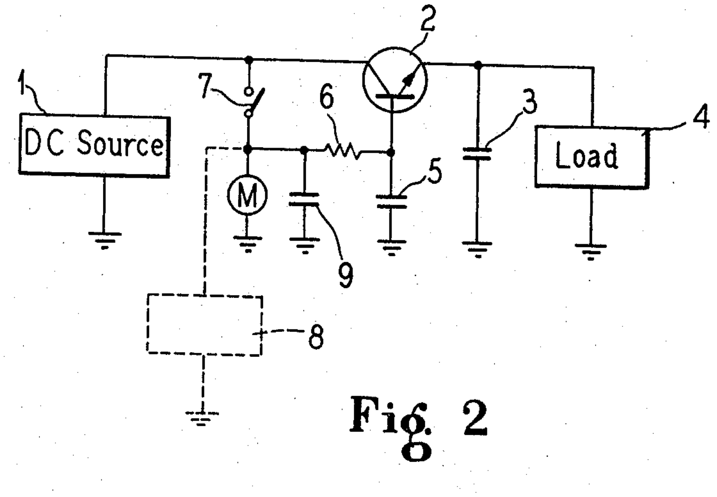
FIG. 2 is a schematic circuit diagram of an embodiment of the invention, shown interconnected between a d.c. source and a load including a d.c. motor.

FIG. 2 illustrates an embodiment of the present invention in connection with a tape recorder, phonograph or the like where a d.c. motor is used. In conventional system, the motor is connected in parallel with the load and functions as a noise generator during the time, after power is removed, when it continues to rotate by inertia. In the circuit of FIG. 2, however, the motor M is isolated from the load. A condenser 9 is connected in parallel with the motor M, and the motor is connected to the source through the switch 7. The remaining components of the circuit of FIG. 2 are identical to those employed in the circuit of FIG. 1.

The motor is disconnected from the source 1 when the switch 7 is opened, so that it does not add a noise to output of the d.c. source.

The two capacitors 5 and 9, together with the resistor 6, from a Pi filter to block the noise signal from the base of the transistor 2.

Figure 3:
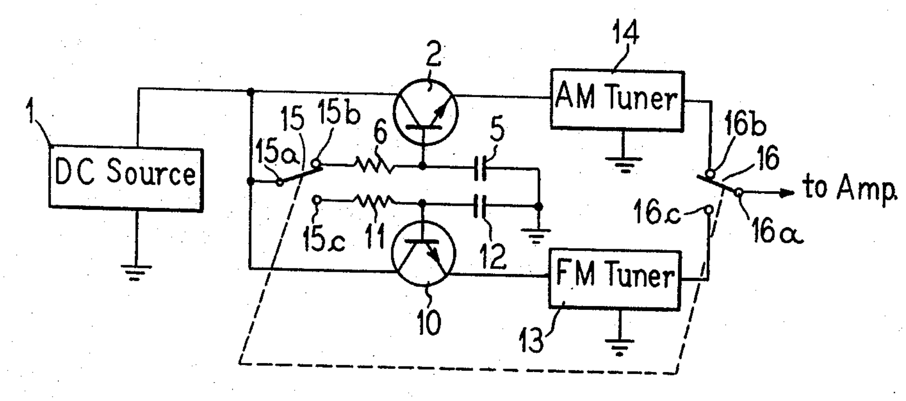
FIG. 3 is a schematic circuit diagram of an embodiment of the invention shown interconnected between a d.c. source and two alternative loads comprising an AM tuner and an FM tuner.

Referring now to FIG. 3, the present invention is illustrated in use with a function selecting switch for a circuit including an AM tuner and an FM tuner. In FIG. 3, a transistor 2 is interconnected between the positive terminal of the d.c. source 1 and the positive terminal of an AM tuner 14. The resistor 6 is interconnected in series with the terminals **15*b* and 15*a* of a switch 15 between the base and collector of the transistor 2, and a capacitor 5 is connected from the base of the transistor 2 to ground, just as in FIG. 1.**

A second silicon transistor 10 is interconnected in similar fashion between the positive terminal of the d.c. source 1 and the positive terminal of an FM tuner 13. A resistor 11 is interconnected in series with the terminals **15*c* and 15*a* of the switch 15 between the base and collector of the transistor 10. A capacitor 12 connects the base of the transistor 10** to ground.

The outputs of the two tuners 13 and 14 are connected to two terminals **16*c* and 16*b* respectively, of a switch 16, the common terminal 16*a* of which is connected to the power amplifier. When the switch 15 is operated to select the terminal 15*b*, as illustrated in FIG. 3, d.c. voltage is supplied from the source 1 to the AM tuner 14. When the switch 15 is in its other condition, selecting the terminal 15*c*, the source 1 is connected to the FM tuner 13. The switches 15 and 16 are ganged so that the output of the tuner having power is selected. When the position of the switch 15** is changed, the voltage is increased gradually so that no click is heard by the loudspeaker. In a similar fashion each tuner has its power reduced gradually when the other is selected, eliminating a turn-off click.

As described above the transistors 2 and 10 are of npn type. However they could instead be replaced by pnp type, in which case they would be interconnected between the negative terminal of the source 1 and the negative terminal of the various utilization devices 4, 8, 13 and 14. The transistors 2 and 10 must be formed of silicon semiconductive material rather than of germanium material, because the germanium transistors do not have a sufficiently small leakage to prevent substantial conduction of current from the source 1 to the load when the transistors are desired to remain nonconductive.

Optionally, the mechanical switches 7, 15 and 16 can be replaced by electric switches or electronic switches if desired.

I claim as my invention:

1. In a switching circuit for selectively connecting a d.c. power source to a load, including an electronic amplifier for amplifying an a.c. signal, said circuit having an input terminal adapted to be connected to a first terminal of said d.c. source, an output terminal adapted to be connected to a first terminal of said load, and a common terminal adapted to be connected to a second terminal of said source and to a second terminal of said load, said first terminal, said output terminal and said common terminal all being independent of said a.c. signal, the combination comprising a silicon transistor having base, emitter and collector electrodes, means for connecting said collector electrode to said input terminal, means for connecting said emitter electrode to said output terminal, a series circuit including a resistor and a switch connected between said base electrode and said input terminal, and a capacitor connected between said base electrode and said common terminal.

2. Apparatus according to claim 1, wherein said switch comprises a manually operable single-pole, single-throw switch.

3. Apparatus according to claim 1, wherein said switch comprises a manually operable single-pole, double-throw switch.

4. Apparatus according to claim 1, wherein said switch is connected to said first input terminal, and including means connecting the junction of said resistor and said switch to a second output terminal.

5. Apparatus according to claim 1, including a second capacitor connected between said output terminal and said common terminal.

6. A power supply circuit comprising a d.c. power source for an electronic amplifier for amplifying an a.c. signal, a silicon transistor having base, emitter and collector electrodes, both of said emitter and collector electrodes being independent of said a.c. signal, means for connecting said collector electrode to a first terminal of said source, means connecting said emitter electrode to an output terminal, a series circuit including a resistor and a switch connected between said base electrode and said collector electrode, and a capacitor connected between said base electrode and a second terminal of said source.

7. Apparatus according to claim 6 wherein said switch is connected to said collector electrode, and including means connecting the junction of said resistor and said switch to a second output terminal.

8. Apparatus according to claim 7, including a capacitor interconnected between said second output terminal and said second terminal of said source.

9. Apparatus according to claim 8, including means adapted to connect said second output terminal to a d.c. motor.

10. A power supply circuit comprising a d.c. power source, a silicon transistor having base, emitter and collector electrodes, means for connecting said collector electrode to a first terminal of said source, means connecting said emitter electrode to an output terminal, a series circuit including a resistor and a switch connected between said base electrode and said collector electrode, a capacitor connected between and base electrode and a second terminal of said source, said switch being a single-pole, double-throw switch having its common terminal connected to said collector electrode, and including a second silicon transistor having base, emitter and collector electrodes, the collector of said second transistor being connected to the collector electrode of the first transistor, means connecting the emitter electrode of said second transistor to a second output terminal, a second resistor connected between a terminal of said switch and the base electrode of said second transistor, and a second capacitor connected between the base electrode of said second transistor and said second terminal of said source.

* * * * *